US012645607B1

(12) United States Patent　　　　　　(10) Patent No.:　US 12,645,607 B1
Sahasrabudhe et al.　　　　　　　　　　(45) Date of Patent:　　Jun. 2, 2026

(54) ADAPTIVE CACHE REPLACEMENT ALGORITHMS FOR SEGMENTED CACHE

(71) Applicant: Dell Products L.P., Round Rock, TX (US)

(72) Inventors: Kaustubh Sahasrabudhe, Westborough, MA (US); Steve Ivester, Grafton, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/034,749

(22) Filed: Jan. 23, 2025

(51) Int. Cl.
　　*G06F 12/12*　　　(2016.01)
　　*G06F 12/121*　　(2016.01)
　　*G06F 12/127*　　(2016.01)
(52) U.S. Cl.
　　CPC ............ *G06F 12/12* (2013.01); *G06F 12/121* (2013.01); *G06F 12/127* (2013.01)
(58) Field of Classification Search
　　None
　　See application file for complete search history.

(56)　　　　　　References Cited

U.S. PATENT DOCUMENTS

| | | | |
|---|---|---|---|
| 12,524,352 B2 * | 1/2026 | Burgess | G06F 12/123 |
| 2010/0057995 A1 * | 3/2010 | Cao | H04L 43/0852 |
| | | | 711/E12.017 |
| 2014/0089559 A1 * | 3/2014 | Cai | G06F 12/127 |
| | | | 711/E12.07 |
| 2021/0157743 A1 * | 5/2021 | Chandrasekaran | G06N 3/044 |
| 2023/0109344 A1 * | 4/2023 | Kelley | G06F 11/3037 |
| | | | 714/30 |
| 2025/0307165 A1 * | 10/2025 | Soundararajan | G06F 12/0891 |

* cited by examiner

*Primary Examiner* — Kaushikkumar M Patel
(74) *Attorney, Agent, or Firm* — Daly, Crowley, Mofford & Durkee, LLP

(57)　　　　　　　ABSTRACT

A method for use in a storage system, comprising: detecting an event; and in response to the event, changing one or more replacement algorithms that are being used by the storage system, wherein changing the one or more replacement algorithms includes: (-)selecting a first segment in a cache of the storage system, the first segment being serviced with a first replacement algorithm; (-)generating a first signature representing a state of the storage system; (-)classifying the first signature with a selection engine to identify a second replacement algorithm, the second replacement algorithm being different from the first replacement algorithm; and (-)configurating the storage system to service the first segment with the second replacement algorithm.

20 Claims, 13 Drawing Sheets

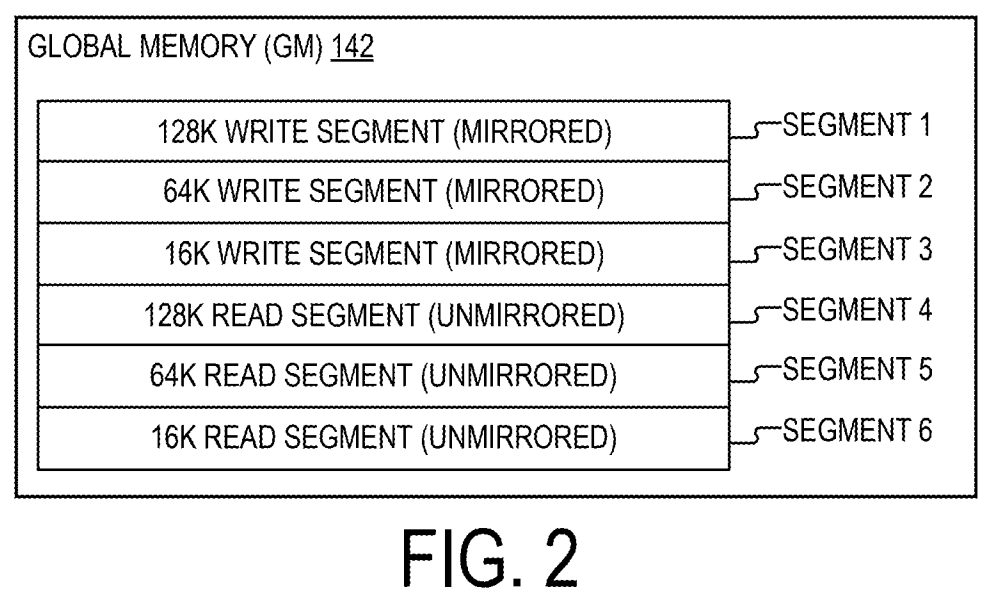

GLOBAL MEMORY (GM) 142

128K WRITE SEGMENT (MIRRORED) — SEGMENT 1

64K WRITE SEGMENT (MIRRORED) — SEGMENT 2

16K WRITE SEGMENT (MIRRORED) — SEGMENT 3

128K READ SEGMENT (UNMIRRORED) — SEGMENT 4

64K READ SEGMENT (UNMIRRORED) — SEGMENT 5

16K READ SEGMENT (UNMIRRORED) — SEGMENT 6

FIG. 2

| POLICY POOL 196 | |
| --- | --- |
| POLICY A | MEM_1 |
| POLICY B | MEM_2 |
| POLICY C | MEM_3 |
| POLICY D | MEM_4 |
| POLICY E | MEM_5 |

FIG. 3

| REPLACEMENT POLICY MAP 194 | |
| --- | --- |
| SEGMENT_1 | POLICY_C |
| SEGMENT_2 | POLICY_C |
| SEGMENT_3 | POLICY_D |
| SEGMENT_4 | POLICY_A |
| SEGMENT_5 | POLICY_E |
| SEGMENT_6 | POLICY_B |

FIG. 4

ADAPTIVE CACHE REPLACEMENT ALGORITHMS FOR SEGMENTED CACHE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: detecting an event; and in response to the event, changing one or more replacement algorithms that are being used by the storage system, wherein changing the one or more replacement algorithms includes: (-)selecting a first segment in a cache of the storage system, the first segment being serviced with a first replacement algorithm; (-)generating a first signature representing a state of the storage system; (-)classifying the first signature with a selection engine to identify a second replacement algorithm, the second replacement algorithm being different from the first replacement algorithm; and (-)configurating the storage system to service the first segment with the second replacement algorithm.

According to aspects of the disclosure, a storage system is provided, comprising: a memory; and one or more processors that are operatively coupled to the memory, the one or more processors being configured to perform the operations of: detecting an event; and in response to the event, changing one or more replacement algorithms that are being used by the storage system, wherein changing the one or more replacement algorithms includes: (-)selecting a first segment in a cache of the storage system, the first segment being serviced with a first replacement algorithm; (-)generating a first signature representing a state of the storage system; (-)classifying the first signature with a selection engine to identify a second replacement algorithm, the second replacement algorithm being different from the first replacement algorithm; and (-)configurating the storage system to service the first segment with the second replacement algorithm.

According to aspects of the disclosure, a non-transitory computer-readable medium storing one or more processor-executable instructions, which, when executed by at least one processor of a storage system, cause the at least one processor to perform the operations of: detecting an event; and in response to the event, changing one or more replacement algorithms that are being used by the storage system, wherein changing the one or more replacement algorithms includes: (-)selecting a first segment in a cache of the storage system, the first segment being serviced with a first replacement algorithm; (-)generating a first signature representing a state of the storage system; (-)classifying the first signature with a selection engine to identify a second replacement algorithm, the second replacement algorithm being different from the first replacement algorithm; and (-)configurating.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a diagram of an example of a cache, according to aspects of the disclosure;

FIG. 3 is a diagram of an example of a replacement policy pool, according to aspects of the disclosure;

FIG. 4 is a flowchart of an example of a replacement policy map, according to aspects of the disclosure;

DETAILED DESCRIPTION

Figure 1A:
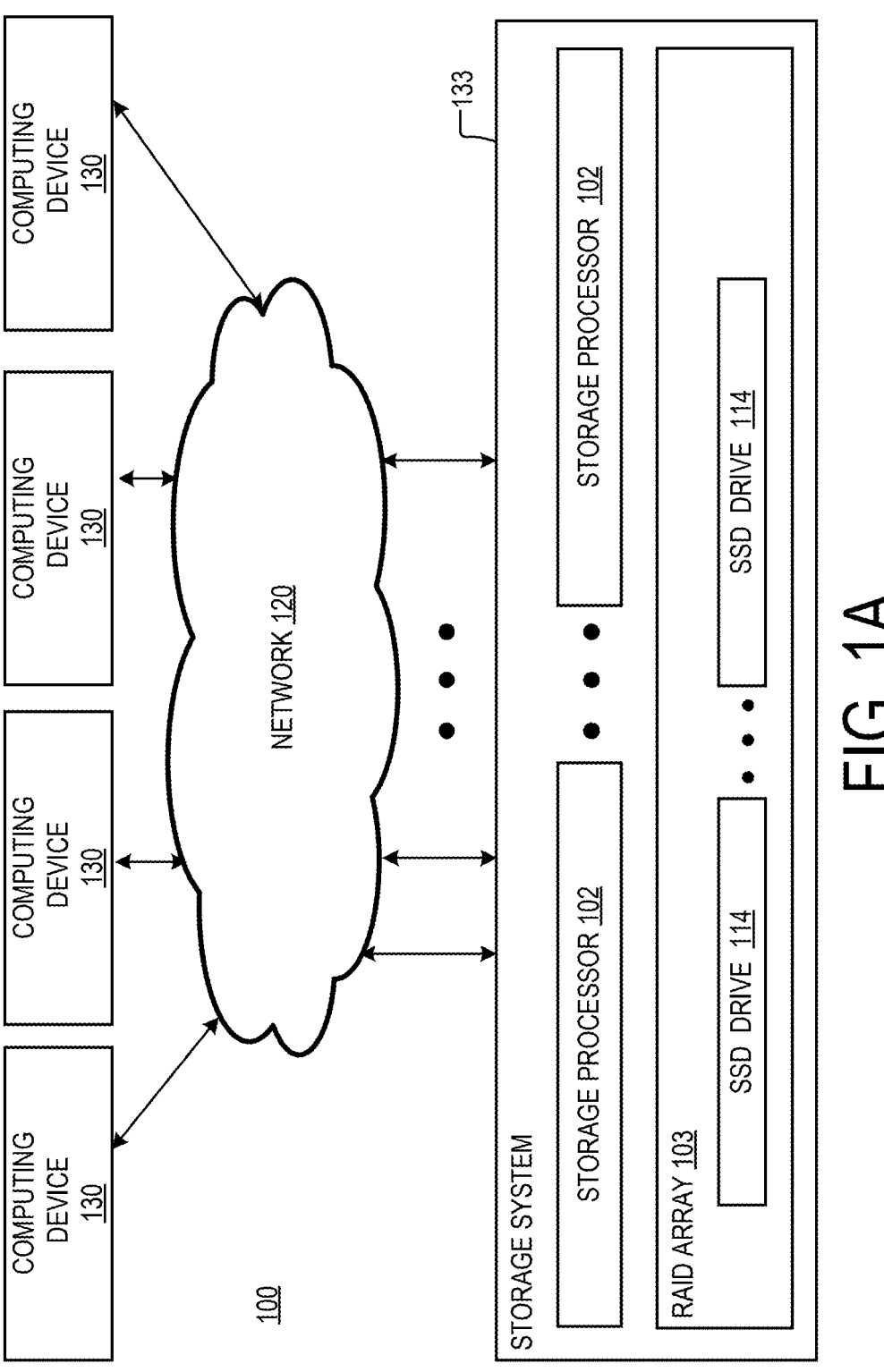
FIG. 1A is a diagram of an example of a system, according to aspects of the disclosure.

FIG. 1A is a diagram of an example of a system 100, according to aspects of the disclosure. As illustrated, system 100 may include a storage system 133 that is coupled to a plurality of computing devices 130 via a communications network 120. Each of the computing devices 130 may include a smartphone, a desktop, a server, a laptop, and/or any other device that might be used by a user to store and retrieve data from the storage system 133. Each of the computing devices 130 may be the same or similar to the computing device 700, which is discussed further below with respect to FIG. 7. The communications network 120 may include one or more of the Internet, a local area network (LAN), a wide area network (WAN), an InfiniBand network, a mobile data network, etc. Storage system 133 may include a plurality of storage processors 102 and a plurality of storage devices 114. In some implementations, each of the storage devices 114 may include a Solid-State Drive (SSD), a Non-Volatile Memory Express (NVME) device, a hard disk, and/or any other suitable type of storage device. According to the present example, the storage devices are arranged in a RAID array 103. Each of the storage processors 102 may include a computing device, such as the computing device 700, which is discussed further below with respect to FIG. 7. Each of the storage processors 102 may be configured to receive I/O requests from the computing devices 130 and execute the received requests by reading or writing data to the RAID array 103.

Figure 1B:
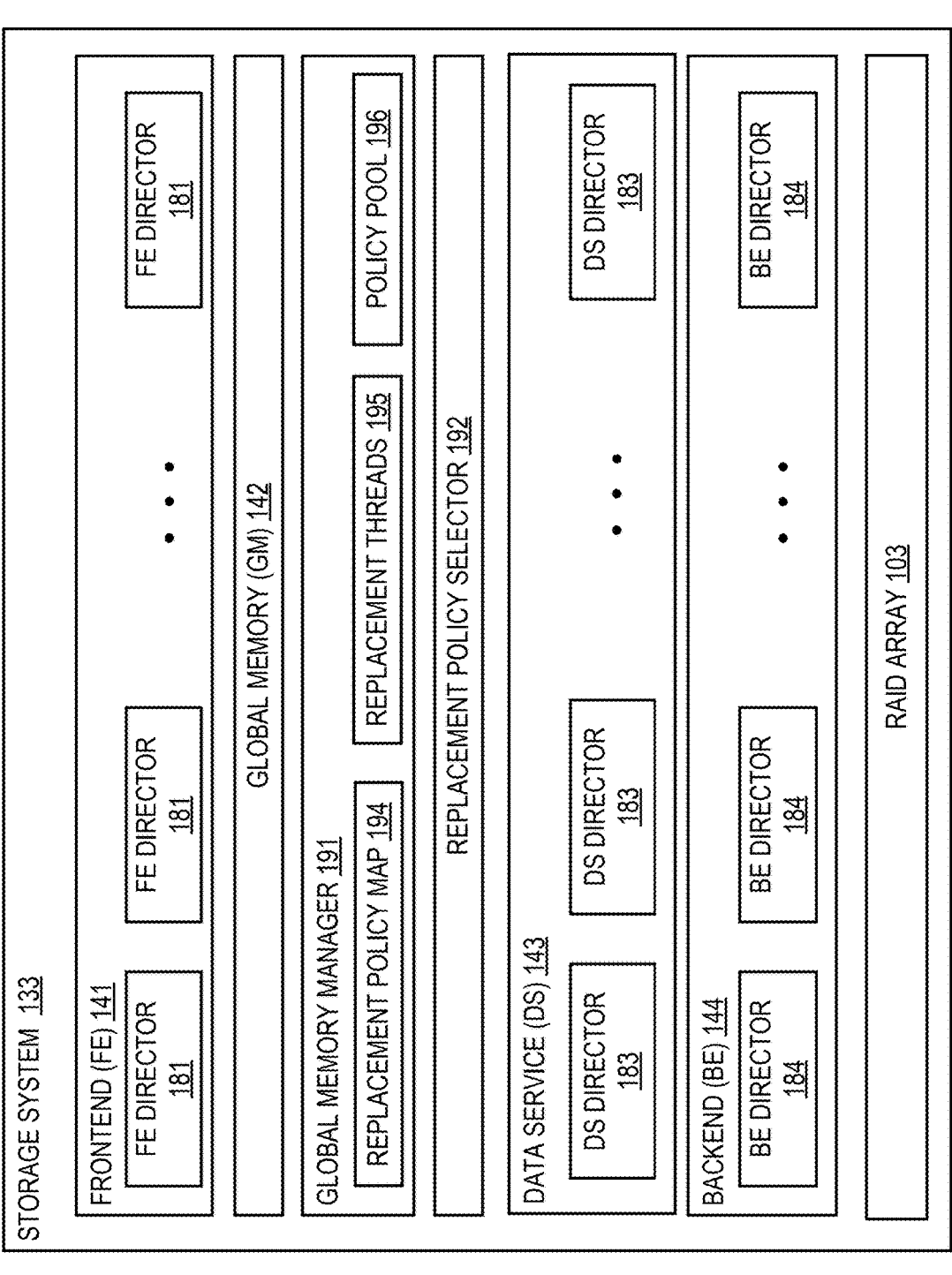
FIG. 1B is a diagram of an example of a storage system, according to aspects of the disclosure.

FIG. 1B is a diagram illustrating aspects of the operation of storage system 133, according to aspects of the disclosure. As illustrated, the storage system 133 may include a frontend (FE) 141, a global memory (GM) 142, a data service (DS) 143, a backend (BE) 144, a global memory manager 191 (hereinafter "manager 191), and a replacement policy selector 192. (herein after "selector 192). FE 141 may be comprised of one or more FE directors 181. Each FE director 181 may include one or more processes that are executed on a respective one of the storage processors 102. DS 143 may be comprised of one or more DS directors 183. Each DS director 183 may include one or more processes that are executed on a respective one of the storage processors 102. BE 144 may be comprised of one or more BE directors 184. Each BE director 184 may include one or more processes that are executed on a respective one of the storage processors 102. GM 142 includes a shared memory space that is used by storage system 133 for caching data. GM 142 may include a plurality of memory portions that are united in the same address space, wherein each of the plurality of memory portions is part of the volatile memory (e.g., DRAM) of a different respective one of the storage processors 102. Although, in the present example, GM 142 is used to cache data, it will be understood that alternative implementations are possible in which GM 142 is replaced with a different type of cache memory. In other words, the present disclosure is not limited to using any specific type of cache memory. In the present example, GM 142 includes a plurality of segments. The plurality of segments is discussed further below with respect to FIG. 2.

Manager 191 is configured to manage GM 142. By way of example, manager 191 may be configured to maintain a replacement policy map 194. Furthermore, manager 191 may be configured to execute a plurality of replacement threads 195. And still furthermore, manager 191 may be configured to maintain a policy pool 196. Manager 191 may be implemented as one or more threads and/or virtual devices that are executed on one or more storage processors 102. In some implementations, manager 191 may be configured to execute processes 600A-C, which are discussed further below with respect to FIGS. 6A-C. In the present example, manager 191 is implemented in software. However, in alternative implementations, manager 191 may be implemented in hardware or as a combination of software and hardware.

Policy pool 196 may include a data structure that identifies a plurality of replacement algorithms that are available in storage system 133. The data structure may be stored in the memory of any computing device that is part of storage system 133 and/or in RAID array 103. The data structure may include a respective identifier for each of the replacement algorithms. For each replacement algorithm, the data structure may further include a pointer (or another identifier) to a memory location where the executable code implementing the algorithm is located. In some implementations, the data structure may be used to instantiate the replacement threads. Specifically, when a replacement thread is being instantiated, the data structure may identify the memory location where the executable code for the thread is located so that this code can be brought into the memory allocated to the thread.

Each of the replacement threads 195 may be configured to execute a respective replacement algorithm. In some instances, each of the replacement threads 195 may be configured to serve fewer than all of the segments in GM 142. In some implementations, each of the replacement threads 195 may be configured to serve only one of the segments in GM 142. Alternatively, in some implementations, each of the replacement threads 195 may be configured to serve all segments in GM 142 that are assigned the same replacement algorithm (e.g., by replacement policy map 194). As used herein, the phrase "replacement thread serving a respective segment" refers to the thread being used to remove data from the respective segment in accordance with the replacement algorithm that is implemented by the thread.

Replacement policy map 194 may include a data structure that maps each of the segments in GM 142 to a respective replacement algorithm assigned to the segment. The data structure may be stored in the memory of any computing device that is part of storage system 133 and/or in RAID array 103. An example of one possible implementation of replacement policy map 194 is discussed further below with respect to FIG. 4.

Figure 1C:
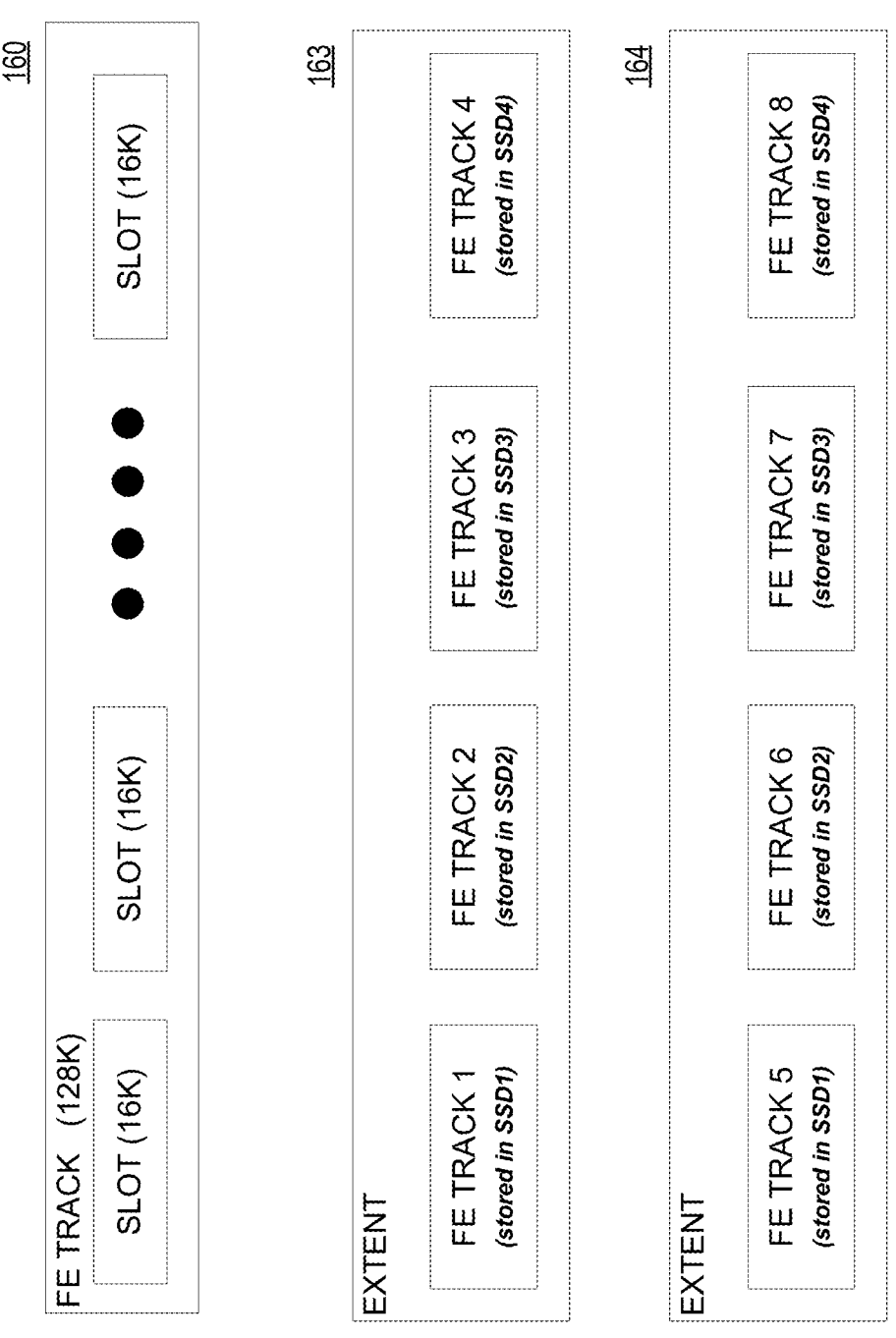
FIG. 1C is a diagram of an example of different units of data storage, according to aspects of the disclosure.

FIG. 1C shows an example of an FE track 160. The term "frontend track," as used throughout the disclosure, refers to a data block, or a unit of data storage, in which data is cached into the GM 142. According to the present example, the FE track 160 is 128K in size, and it consists of a plurality of slots that are each 16K in size. However, in an alternative implementation, the FE track 160 may have a mix of 64K and 16K slots. Stated succinctly, the present disclosure is not limited to any specific implementation of the FE track 160 and/or the slots that form the FE track. The term "slot," as used herein, refers to a smaller unit of data storage that is part of an FE track. Further shown in FIG. 1C are extents 163 and 163. Extent 163 includes FE tracks 1-4, and extent 164 includes FE tracks 5-8. As used herein, the term "extent" refers to a set of sequential FE tracks (i.e., FE tracks having sequential addresses). According to the present example, any of FE tracks 1-8 is the same or similar to FE tack 160.

Figure 1D:
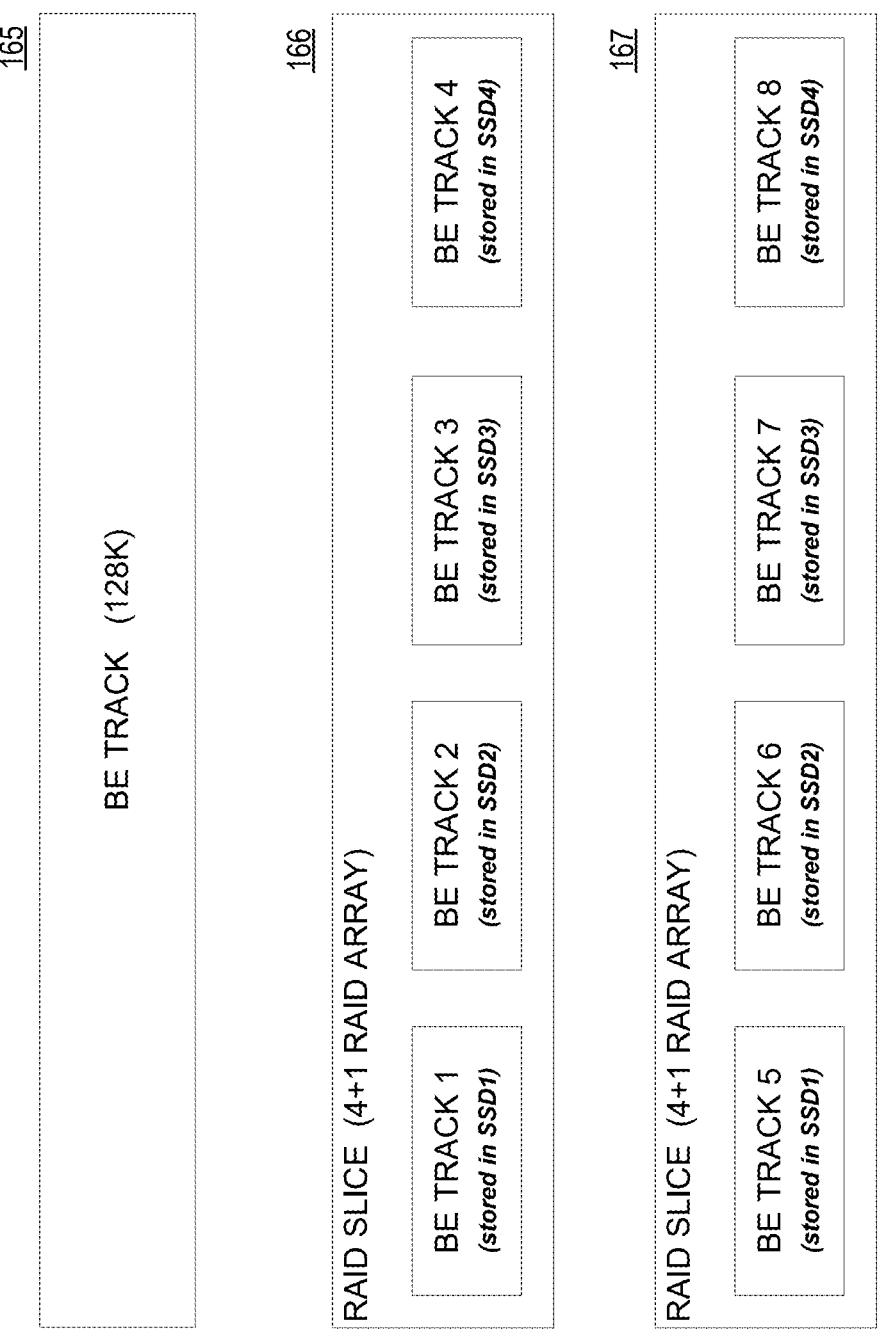
FIG. 1D is a diagram of an example of different units of data storage, according to aspects of the disclosure.

FIG. 1D shows an example of a BE track 165. The term "backend track," as used throughout the disclosure, refers to a data block, or a unit of data storage, in which data is stored in the RAID array 103. According to the present example, the BE track 165 is 128K in size. However, the present disclosure is not limited to any specific implementation of the BE track 165. According to the present example, the BE track 165 is not divided into slots, as is the case with the FE track 160, which is discussed above with respect to FIG. 1C. However, the present disclosure is not limited thereto, and in some implementations, the BE track 165 may be divided into slots. Stated succinctly, the present disclosure is not limited to any specific implementation of the BE track 165. The term "slot," as used herein, refers to a smaller unit of data storage that is part of a BE track. Further shown in FIG. 1D are RAID slices 166 and 167. RAID slice 166 includes BE tracks 1-4, and RAID slice 167 includes BE tracks 5-8. As is well-known in the art, the term "RAID slice" refers to a logical segment or partition of storage within a RAID array. Although, the example of FIG. 1D assumes a 4+1 RAID array, it will be understood that the present disclosure is not limited to any specific type of RAID configuration. Furthermore, it will be understood that the present disclosure is not limited to any specific size of the FE tracks and the BE tracks used by storage system 133. The mapping between BE tracks and corresponding RAID slices may be established by a data structure stored in the memory of one or more storage processors 102 or elsewhere in storage system 133. The mapping may be static, or it may change from time to time. The present disclosure is not limited to any specific method for implementing the mapping. Furthermore, according to the present example, each of the FE tracks is given a unique address that belongs to a frontend track address space maintained at FE 141, and each of the BE tracks is given a unique address that belongs to a backend track address space that is maintained at BE 144.

Figure 1E:
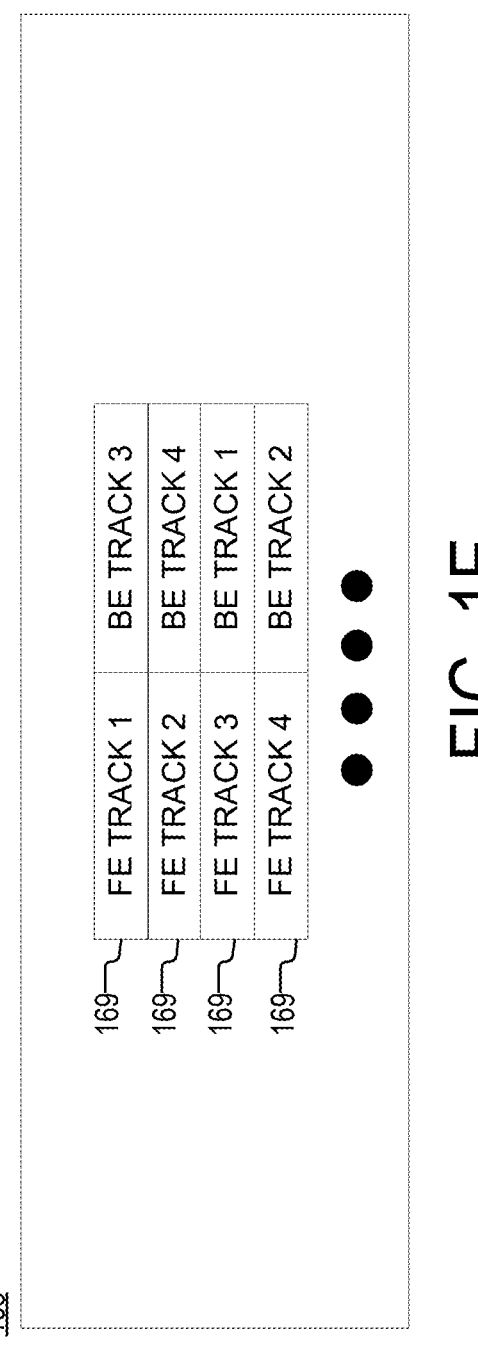
FIG. 1E is a diagram of an example of a data structure, according to aspects of the disclosure.

FIG. 1E is a diagram of an example of a data structure 168, according to aspects of the disclosure. According to the present example, data structure 168 includes a plurality of entries 169. Each entry 169 includes an identifier (e.g., an address) of a respective FE track in GM 142 and an identifier (e.g., an address) of a respective backend track. In other words, data structure 168 is a map that maps each of the plurality FE tracks in GM 142 to a different corresponding one of the backend tracks. The data structure 168 may be stored in the memory of one or more storage processors 102 and/or elsewhere in the storage system 133. The present disclosure is not limited to any specific implementation of data structure 168. Data structure 168 may be implemented as a single file, a plurality of files, a single database object, a plurality of database objects, and/or in any other suitable manner. Further information about the architecture shown in FIGS. 1A-E can be found in U.S. patent application Ser. No. 18/820,867, entitled INTELLIGENT RELOCATION DESTAGE, which is hereby incorporated by reference herein in its entirety.

FIG. 2 is a diagram of GM 142, in accordance with one particular implementation. As illustrated, GM 142 may include a plurality of segments, which are herein enumerated as segment 1, segment 2, segment 3, segment 4, segment 5, and segment 6. Segment 1 may be used to store data (e.g., user data and/or metadata) that is associated with write requests whose page size is 128K. Segment 2 may be used to store data (e.g., user data and/or metadata) that is associated with write requests whose page size is 64K. Segment 3 may be used to store data (e.g., user data and/or metadata) that is associated with write requests whose page size is 16K. Segment 4 may be used to store data (e.g., user data and/or metadata) that is associated with read requests whose page size is 128K. Segment 5 may be used to store data (e.g., user data and/or metadata) that is associated with read requests whose page size is 64K. Segment 6 may be used to store data (e.g., user data and/or metadata) that is associated with read requests whose page size is 16K.

In some implementations, each page in any of segments 1-6 may have a respective logical address. In the present example, the logical address of each page in any of segments 1-6 belongs to the same address space. In other words, in the present example, segments 1-6 are part of the same address space. However, alternative implementations are possible in which each of segments 1-6 is given a different address space.

In the present example, each of segments 1-3 is a mirrored segment. This means that the data that is saved in each logical address (or page) in the segment is copied to two physical memory locations. In the present example, each of segments 4-6 is unmirrored. This means that the data that is saved in each logical address (or page) in the segment is copied into a single physical memory location only.

In some implementations, storage system 133 may store in its memory a data structure that maps a respective identifier of each of the segments in GM 142 to the logical addresses that belong in that segment. The data structure may be used in instantiating and/or configuring any of the replacement threads 195. The data structure may be used to identify the logical addresses that are part of a particular segment, after which the logical addresses may be provided to a replacement thread 195, which is desired to serve the segment.

FIG. 3 is a schematic diagram of an example of policy pool 196, according to aspects of the disclosure. As illustrated, policy pool 196 may include a plurality of entries. Each entry may include a different respective identifier of a replacement algorithm and an indication of a memory location (in the memory of storage system 133) where the executable code implementing the replacement algorithm is stored. A used herein, the phrases "replacement algorithm" and "replacement policy" are used interchangeably. The term replacement algorithm refers to an algorithm for removing data stored in a cache or cache segment, such as any of the segments in GM 142.

In the example of FIG. 3, the replacement algorithms that are identified in the policy pool 196 are enumerated as policy A through I. A brief description of each of the replacement algorithms is provided below.

Policy A—Preferred for Small Block Sequential Reads and Large Block Sequential Reads: This policy implements a time-aware most recently used (T-MRU) replacement algorithm. The algorithm evicts the most recently used memory page older than N seconds. The algorithm has a less expensive search cost as it requires iterative search and compare for most optimal eviction candidates. According to the algorithm, any memory page older than N seconds is a valid candidate for eviction from cache, which results in a reduced overall search cost.

Policy B—Preferred for Small Block Random Reads: This policy implements a least recently used (LRU) replacement algorithm. The algorithm evicts the least recently used memory page based on a tag timestamp. The algorithm encourages potential cache hits by leaving data in cache as long as possible. The algorithm has a most expensive search cost as it requires iterative search and compare to find top eviction candidates.

Policy C—Preferred for Small Block Sequential Writes and Large Block Sequential Writes: This policy implements a last-in first-out (LIFO) replacement algorithm. The algorithm evicts the most recently replaced memory page. The algorithm has a minimal search cost, as it relies on a fast atomic memory page queue.

Policy D—Preferred for Small Block Random Writes: This policy implements a pseudo-random replacement algorithm. The policy evicts a random memory page after a round-robin extent selection. In other words, the extent from which data is going to be evicted is selected in a round-robin fashion, while the exact page that is evicted from the extent is chosen at random. The algorithm has a very inexpensive cost for finding a memory page to evict. The algorithm is beneficial when cache misses are relatively inexpensive and the cache is undersized.

Policy E—Preferred for Large Block Random Reads: This policy implements a least recently frequently used (LRFU) algorithm. The algorithm evicts memory pages based on a least recently used timestamp and a least frequently accessed memory page counter. The algorithm weighs both the value of the oldest memory page and the frequency of access to try and avoid expensive cache misses after eviction.

In some respects, the facility of each of policies A-E may depend on the current state of storage system 133. For example, it may depend on the CPU load on storage processors 102, the amount of free space and/or size of GM 142, the type of input-output (I/O) traffic that is being received at storage system 133, and so forth. Thus, at different time instances, a different one of policies A-E may yield the best results (in terms of avoiding cache misses) for the same segment of GM 142. The discussion that follows provides a technique for dynamically changing and/or selecting the replacement algorithm that serves a particular segment of GM 142 based on the current state of storage system 133. Policies A-E are provided only as an example. The present disclosure is not limited to any specific replacement policy being part of the replacement policy pool 196.

FIG. 4 is a diagram of the replacement policy map 194, according to aspects of the disclosure. As illustrated, map 194 may include a plurality of entries. Each entry may include an identifier of a different segment in GM 142 and an identifier of the replacement algorithm that is currently assigned to serve the identified segment.

Figure 5:
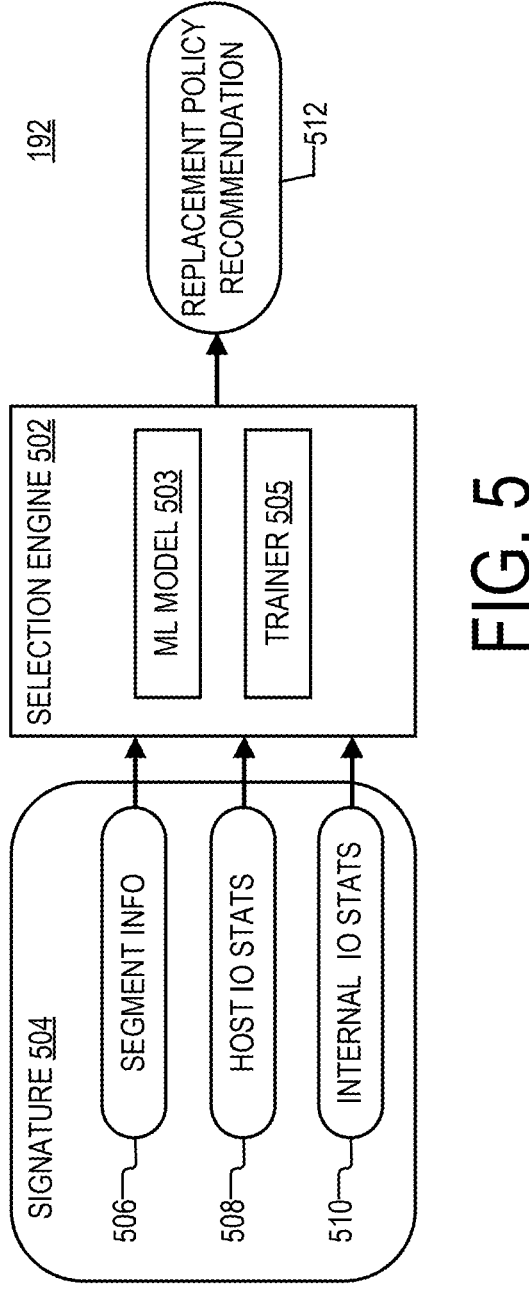
FIG. 5 is a flowchart of an example of a replacement policy selector, according to aspects of the disclosure.

FIG. 5 is a schematic diagram of the selector 192. As illustrated, the selector 192 may be configured to execute a selection engine 502. Selection engine 502 may be configured to implement a machine learning (ML) model 503 and a trainer 505. According to the present example, model 503 and trainer 505 are implemented in software that is executed by the central processing units (CPUs) of one or more storage processors (or other computing devices) that are part of storage system 133. However, alternative implementations are possible in which any of model 503 and trainer 505 is implemented in hardware or as a combination of software and hardware.

According to the present example, the model 503 is an autoregressive integrated moving average (ARIMA) model. Model 503 is configured to receive as input a signature 504 that represents the current state of storage system 133 and output a replacement policy recommendation 512 in response. Recommendation 512 may be a numerical (or other) identifier of a replacement policy that is preferred for a particular segment in GM 142, given the current state of storage system 133.

Signature 504 may include or otherwise encode one or more of segment information 506, host IO statistics 508 (hereinafter "information 508"), and internal IO statistics (hereinafter "information 510"). By the nature of the information it encodes, signature 504 may represent the current state (or a recent state) of storage system 133.

Information 506 may include an identifier of a particular segment in GM 142 for which a replacement policy recommendation is sought. Additionally or alternatively, information 506 may identify one or more of the page size of the segment, a total size of the segment, an indication of whether the segment is mirrored or unmirrored, and an indication of whether the segment is used to store data associated with read or write requests. Any of the variables that constitute information 506 may be weighted as needed.

Information 508 may include any suitable type of information I/O requests that are received at storage system 133 from external (customer) devices, such as the computing devices 130. By way of example, information 508 may identify (or otherwise encode) the ratio of read requests versus write requests that are received. For instance, information 508 may include a time series indicating the read-to-write ratio at different instants in the same collection window. Additionally or alternatively, information 508 may identify the respective sizes of any read requests that are received at storage system 133 (e.g., the sizes of data that is being requested to be read). For instance, information 508 may include a time series indicating the respective sizes of the individual read requests that are received during the same collection window, or time series indicating the average sizes of different groups of read requests that are received during the same collection window. Additionally or alternatively, information 508 may identify the respective sizes of any write requests that are received at storage system 133 (e.g., the sizes of data that is being requested to be read). For instance, information 508 may include a time series indicating the respective sizes of the individual write requests that are received during the same collection window, or time series indicating the average sizes of different groups of write requests that are received during the same collection window. Additionally or alternatively, information 508 may indicate whether user data associated with the I/Os is compressible and/or the degree to which the data is compressible. For instance, information 508 may include a time series indicating the respective compression ratios of the individual write requests that are received during the same collection window, or time series indicating the average compression ratios of different groups of write requests that are received during the same collection window. Stated succinctly, information 508 may include a time series (or other information) that identifies trends and/or patterns that are exhibited by I/Os, received by storage system 133 from external devices, during the time window in which information 508 is captured.

Information 510 may include any suitable type of information about I/O requests that are generated internally within storage system 133. In other words, information 510 may include information above I/O requests that originate from one of storage processors 102 and/or any other computing device that is part of storage system 133. By way of example, information 510 may identify (or otherwise encode) the ratio of read requests versus write requests that are received. For instance, information 510 may include a time series indicating the read-to-write ratio at different instants in the same collection window. Additionally or alternatively, information 510 may identify the respective sizes of any read requests that are received at storage system 133 (e.g., the sizes of data that is being requested to be read). For instance, information 510 may include a time series indicating the respective sizes of the individual read requests that are received during the same collection window, or time series indicating the average sizes of different groups of read requests that are received during the same collection window. Additionally or alternatively, information 510 may identify the respective sizes of any write requests that are received at storage system 133 (e.g., the sizes of data that is being requested to be read). For instance, information 510 may include a time series indicating the respective sizes of the individual write requests that are received during the same collection window, or time series indicating the average sizes of different groups of write requests that are received during the same collection window. Additionally or alternatively, information 510 may indicate whether user data associated with the I/Os is compressible and/or the degree to which the data is compressible. For instance, information 510 may include a time series indicating the respective compression ratios of the individual write requests that are received during the same collection window, or time series indicating the average compression ratios of different groups of write requests that are received during the same collection window. Stated succinctly, information 510 may include a time series (or other information) that identifies trends and/or patterns that are exhibited by I/Os, which are generated internally in storage system 133, during the time window in which information 510 is captured.

Trainer 505 may be configured to train the model 503. In some implementations, model 503 may be trained based on historical data for storage system 133 which contains the same type of data that is discussed above with respect to one or more of information 506, 508, and 510.

In some implementations, model 210 may be trained by performing the steps which are listed in Table 1 below:

TABLE 1

Step 1: Visualize the Training Data that is Organized in a Time Series
Step 2: Make the Time Series Stationary
Step 3: Choose ARIMA Model Parameters
Step 4: Train the ARIMA Model
Step 5: Evaluate the Model
Step 6: Tune the Model
Step 7: Forecast with the Model
Step 8: Validate the Forecast In some implementations, Steps 1-4 may be performed by executing the Python code which is provided in Table 2 below, which uses standard libraries that are provided with Python:

TABLE 2

```
from statsmodels.tsa.arima.model import ARIMA
# Define the model with chosen p, d, q
model = ARIMA(data, order=(p, d, q))
# Fit the model to the data
model_fit = model.fit( )
```

Figure 6A:
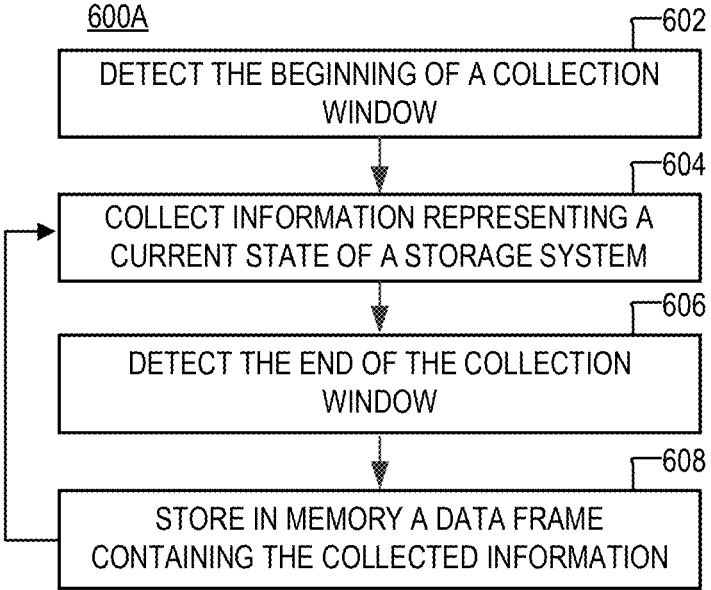
FIG. 6A is a flowchart of an example of a process, according to aspects of the disclosure.

FIG. 6A is a flowchart of an example of a process 600A, according to aspects of the disclosure. In the example of FIG. 6A, process 600A is performed by manager 191. However, the present disclosure is not limited to any specific entity or set of entities performing the process 600A. At step 602, manager 191 detects a first timer event that signals the beginning of a collection window. At step 604, manager 191 collects information representing the current state of storage system 133. The collected information may be any information that is suitable for generating signatures, such as the signature 504, which is discussed above with respect to FIG. 5. The collected information may be the same or similar to information 508 and 510, which is discussed above with respect to FIG. 5. At step 606, manager 191 detects a second timer event signaling the end of the collection window and the beginning of a new collection window. In response to detecting the second timer event at step 608, manager 191 generates and stores in memory a data frame containing the collected data, after which process 600A returns to step 604, where it begins the collection of a new data frame.

Figure 6B:
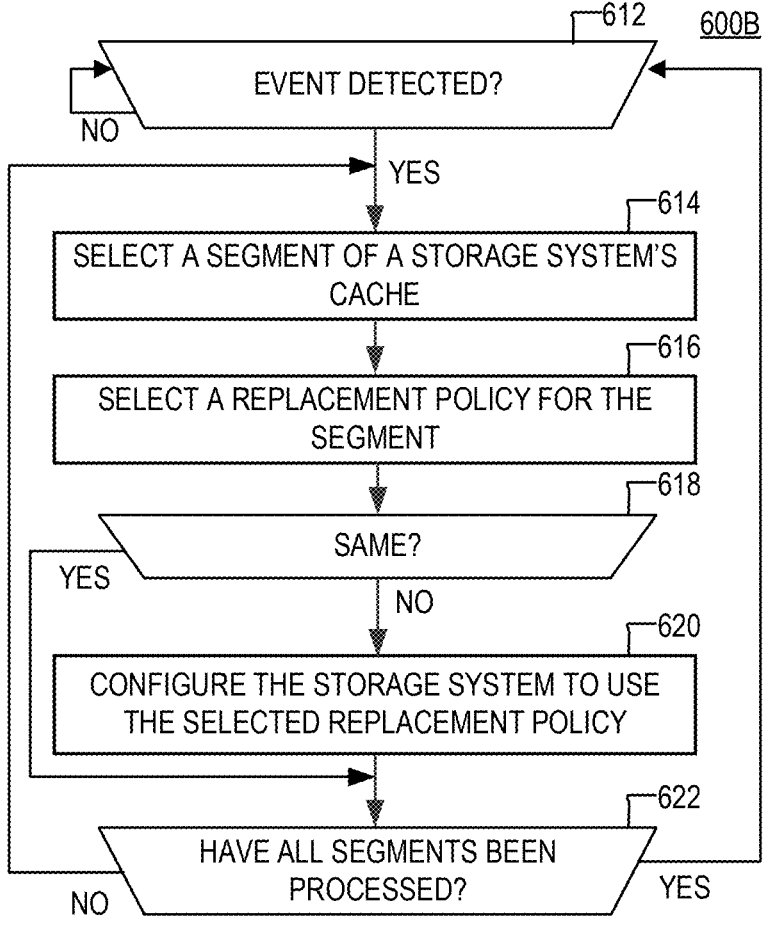
FIG. 6B is a flowchart of an example of a process, according to aspects of the disclosure.

FIG. 6B is a flowchart of an example of a process 600B, according to aspects of the disclosure. In the example of FIG. 6B, process 600B is performed by manager 191. However, the present disclosure is not limited to any specific entity or set of entities performing the process 600B.

At step 612, manager 191 detects whether a predetermined event generated by one or more components (e.g., software and/or hardware) of storage system 133. In one example, the predetermined event may be a timer event that is generated periodically (e.g., every half hour or every 2 hours, etc.). In another example, the predetermined event may be generated based on a performance metric crossing one of a set of thresholds. The set of thresholds may include one threshold or a plurality of thresholds. The threshold may be crossed when the performance metric is either on an upward trajectory or on a downward trajectory. In one example, the performance metric includes the response time of storage system 133. In another example, the performance metric includes the load on storage system 133 (e.g., measured in I/Os per second IOPS). In yet another example, the performance metric may be the cache hit rate or cache miss rate of GM 142. If the predetermined condition is selected, process 600B proceeds to step 614. Otherwise, step 612 is repeated.

At step 614, manager 191 selects one of the segments in GM 142. The selected segment may be one that has not been selected previously after the most recent occurrence of the event (at step 612).

At step 616, manager 191 selects a replacement algorithm for the segment (chosen at step 614). In some implementations, the replacement algorithm may be selected in accordance with a process 600C, which is discussed further below with respect to FIG. 6C.

At step 618, manager 191 detects whether the replacement algorithm (selected at step 616) is the same as the replacement algorithm that is currently being used to service the section of GM 142 that was most recently selected at step 614. If they are the same, process 600B proceeds to step 622. Otherwise, if the two replacement algorithms are different, process 600B proceeds to step 620.

At step 620, manager 191 configures the storage system 133 to use the replacement algorithm (selected at step 616) with respect to the segment (selected at step 614). Configuring storage system 133 to use the selected replacement algorithm may include any action that causes storage system 133 to use the selected replacement algorithm to remove data from the segment that is selected at the most recent execution of step 614.

In one example, configuring storage system 133 to use the replacement algorithm may include: (i) identifying a first one of threads 195 that is currently used to service the segment (selected at step 614), and which implements a different replacement algorithm than the one selected at step 616, (ii) terminating the first thread 195, (iii) instantiating a new thread 195 that implements the replacement algorithm (selected at step 616), (iv) and causing the new thread 195 to begin serving the segment (selected at step 614).

In another example, configuring storage system 133 to use the replacement algorithm may include: (i) identifying a first one of threads 195 that is currently used to service the segment (selected at step 614), and which implements a different replacement algorithm than the one selected at step 616, (ii) causing the first thread 195 to stop servicing the segment that is selected during the most recent execution of step 616, (iii) identifying a second one of the threads 195 that implements the replacement algorithm that is selected in the most recent execution of step 616, and (iv) causing the second thread 195 to service the segment (selected at step 614). Additionally or alternatively, manager 191 may provide to the second thread 195 the logical addresses of the pages in the segment (selected at step 614) along with an instruction that causes the second thread 195 to begin replacing the data stored at the logical addresses. In one example, manager 191 may provide to the first thread 195 the logical addresses of the pages in the segment (selected at step 614) along with an instruction that causes the first thread 195 to stop replacing the data stored at the logical addresses.

At step 622, a determination is made if all segments in GM 142 have been selected (at step 614) since the most recent execution of step 612. If all segments have been selected already, process 600B returns to step 612. Otherwise, process 600B returns to step 614.

In the example of FIG. 6, each of the segments in GM 142 is processed in response to the event (detected at step 612). However, alternative implementations are possible in which only one (or fewer than all) of the segments are processed.

For example, the event (detected at step 612) may be generated when the cache hit rate or cache miss rate of a given segment in GM 142 crosses one of the thresholds in a set. The set may include one or more thresholds, and the threshold may be crossed when the cache hit or miss rate is in an upward or downward trajectory. In response to the event, the replacement algorithm of only the given segment may be changed (or reassessed). The change or reassessment may be performed in the manner discussed above with respect to steps 616-620.

Figure 6C:
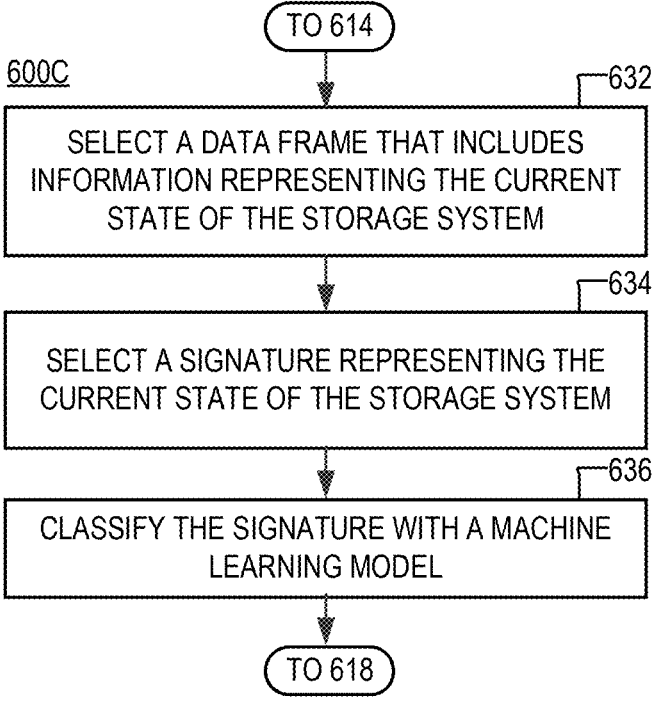
FIG. 6C is a flowchart of an example of a process, according to aspects of the disclosure.

FIG. 6C is a flowchart of an example of a process 600C for selecting a replacement algorithm, as specified in step 616 of process 600B. In the example of FIG. 6C, process 600C is performed by manager 191. However, the present disclosure is not limited to any specific entity or set of entities performing the process 600C.

At step 632, manager 191 selects a data frame that includes information representing the current state of storage system 133. The data frame may be the same or similar to the data frame that is generated by executing process 600A, which is discussed with respect to FIG. 6A. According to the present example, the most recent data frame that is created by process 600A is selected. However, the present disclosure is not limited thereto.

At step 634, manager 191 generates a signature based on the information contained in the data frame (selected at step 632). The signature may be the same or similar to signature 504, which is described above with respect to FIG. 5. In one example, the signature may be generated based on information associated with IOs that are associated with data that is stored in any of the segments in GM 142. In another example, the signature may be generated based on information associated with IOs that are associated with data that is stored only in the segment selected at step 614. The signature may also include identifying information for the segment, such as an identifier of the segment, page size of the segment, an indication of whether the segment is mirrored or not, and so forth.

At step 636, manager 191 executes model 503 based on the signature. Specifically, manager 191 may provide the signature (generated at step 634) as input to model 503. Model 503 may then classify the signature and produce an indication (or identifier) of a replacement algorithm as a result of the classification, after which model 503 may provide the indication to manager 191. The indicated replacement algorithm is the algorithm that is selected as a result of executing step 616.

Figure 7:
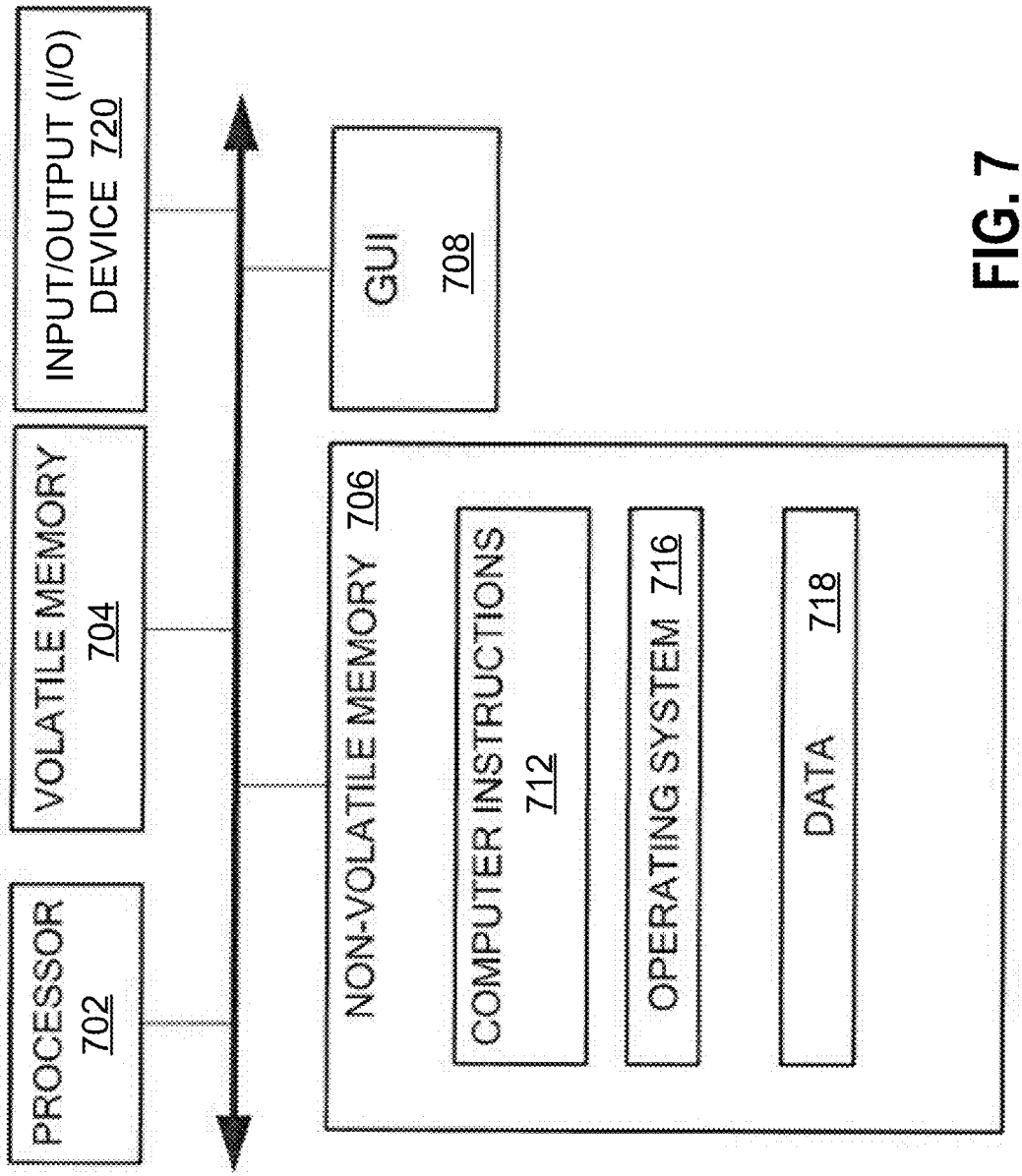
FIG. 7 is a diagram of an example of a computing device, according to aspects of the disclosure.

Referring to FIG. 7, in some embodiments, a device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1A-7 are provided as an example only. In some embodiments, the term "I/O request" or simply "I/O" may be used to refer to an input or output request. At least some of the steps discussed with respect to FIGS. 1-7 may be performed in a different order, in parallel, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks". In the example of FIGS. 1A-7, storage system 133 is a content-addressable storage system. However, the concept and ideas presented throughout the specification can be applied to location-addressable storage systems and/or any other suitable type of storage system. As used throughout the disclosure, the term "thread" refers to any series of processor executable instructions irrespective of how the instructions or scheduled or how memory for the execution of the instructions is allocated. In this regard, the terms "thread" or "process" are used interchangeably for the purposes of the present disclosure.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus. In the example of FIGS. 1A-8, storage system 133 is a content-addressable storage system. However, the concept and ideas presented throughout the specification can be applied to location-addressable storage systems and/or any other suitable type of storage system.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
detecting an event; and
in response to the event, changing one or more replacement algorithms that are being used by the storage system, wherein changing the one or more replacement algorithms includes: selecting a first segment in a cache of the storage system, the first segment being serviced with a first replacement algorithm; generating a first signature representing a state of the storage system; classifying the first signature with a selection engine to identify a second replacement algorithm, the second replacement algorithm being different from the first replacement algorithm; and configurating the storage system to service the first segment with the second replacement algorithm.

2. The method of claim 1, wherein configuring the storage system to service the first segment with the second replacement algorithm includes terminating a first thread that implements the first replacement algorithm, and instantiating a second thread that implements the second replacement algorithm.

3. The method of claim 1, wherein configuring the storage system to service the first segment with the second replacement algorithm includes causing a first thread that implements the first replacement algorithm to stop servicing the first segment, and causing a second thread that implements the second replacement algorithm to begin servicing the first segment.

4. The method of claim 1, wherein the selection engine is configured to execute a machine learning model that is configured to receive the first signature as input, and output an indication of the second replacement algorithm based the first signature, the machine learning model being an autoregression integrated moving average (ARIMA) model.

5. The method of claim 1, wherein the first signature is generated based on information that is associated with a first plurality of inputs-outputs (IOs) that are received from computing devices that are external to the storage system and a second plurality of IOs that are generated internally within the storage system.

6. The method of claim 1, wherein the first signature is generated based on information that is associated with a plurality of inputs-outputs (IOs), the information identifying an IO pattern that is specific to the first segment.

7. The method of claim 1, wherein the event includes a timer event.

8. The method of claim 1, wherein the event is generated in response to a performance metric of the storage system crossing a threshold.

9. The method of claim 1, wherein changing the one or more replacement algorithms further includes: selecting a second segment in a cache of the storage system, the second segment being serviced with a third replacement algorithm; generating a second signature representing a state of the storage system; classifying the second signature with the selection engine to identify a fourth replacement algorithm, the fourth replacement algorithm being different from the third replacement algorithm; and configurating the storage system to service the second segment with the fourth replacement algorithm.

10. A storage system, comprising:
a memory; and
one or more processors that are operatively coupled to the memory, the one or more processors being configured to perform the operations of:

detecting an event; and in response to the event, changing one or more replacement algorithms that are being used by the storage system, wherein changing the one or more replacement algorithms includes: selecting a first segment in a cache of the storage system, the first segment being serviced with a first replacement algorithm; generating a first signature representing a state of the storage system; classifying the first signature with a selection engine to identify a second replacement algorithm, the second replacement algorithm being different from the first replacement algorithm; and configurating the storage system to service the first segment with the second replacement algorithm.

11. The storage system of claim 10, wherein configuring the storage system to service the first segment with the second replacement algorithm includes terminating a first thread that implements the first replacement algorithm, and instantiating a second thread that implements the second replacement algorithm.

12. The storage system of claim 10, wherein configuring the storage system to service the first segment with the second replacement algorithm includes causing a first thread that implements the first replacement algorithm to stop servicing the first segment, and causing a second thread that implements the second replacement algorithm to begin servicing the first segment.

13. The storage system of claim 10, wherein the selection engine is configured to execute a machine learning model that is configured to receive the first signature as input, and output an indication of the second replacement algorithm based the first signature, the machine learning model being an autoregression integrated moving average (ARIMA) model.

14. The storage system of claim 10, wherein the first signature is generated based on information that is associated with a first plurality of inputs-outputs (IOs) that are received from computing devices that are external to the storage system and a second plurality of IOs that are generated internally within the storage system.

15. The storage system of claim 10, wherein the first signature is generated based on information that is associated with a plurality of inputs-outputs (IOs), the information identifying an IO pattern that is specific to the first segment.

16. The storage system of claim 10, wherein the event is generated in response to a performance metric of the storage system crossing a threshold.

17. The storage system of claim 10, wherein changing the one or more replacement algorithms further includes: selecting a second segment in a cache of the storage system, the second segment being serviced with a third replacement algorithm; generating a second signature representing a state of the storage system; classifying the second signature with the selection engine to identify a fourth replacement algorithm, the fourth replacement algorithm being different from the third replacement algorithm; and configurating the storage system to service the second segment with the fourth replacement algorithm.

18. A non-transitory computer-readable medium storing one or more processor-executable instructions, which, when executed by at least one processor of a storage system, cause the at least one processor to perform the operations of:

detecting an event; and in response to the event, changing one or more replacement algorithms that are being used by the storage system, wherein changing the one or more replacement algorithms includes: selecting a first segment in a cache of the storage system, the first segment being serviced with a first replacement algorithm; generating a first signature representing a state of the storage system; classifying the first signature with a selection engine to identify a second replacement algorithm, the second replacement algorithm being different from the first replacement algorithm; and configurating the storage system to service the first segment with the second replacement algorithm.

19. The non-transitory computer-readable medium of claim 18, wherein configuring the storage system to service the first segment with the second replacement algorithm includes terminating a first thread that implements the first replacement algorithm, and instantiating a second thread that implements the second replacement algorithm.

20. The non-transitory computer-readable medium of claim 18, wherein configuring the storage system to service the first segment with the second replacement algorithm includes causing a first thread that implements the first replacement algorithm to stop servicing the first segment, and causing a second thread that implements the second replacement algorithm to begin servicing the first segment.

* * * * *